United States Patent
Dell et al.

(10) Patent No.: US 10,544,935 B2
(45) Date of Patent: Jan. 28, 2020

(54) EVAPORATOR BURNER FOR A MOBILE HEATING DEVICE OPERATED WITH LIQUID FUEL

(71) Applicant: WEBASTO SE, Stockdorf (DE)

(72) Inventors: Vitali Dell, Stockdorf (DE); Klaus Moesl, Stockdorf (DE); Stefan Sommerer, Stockdorf (DE); Thomas Kerscher, Stockdorf (DE)

(73) Assignee: Webasto SE, Stockdorf (DE)

( * ) Notice: Subject to any disclaimer, the term of this patent is extended or adjusted under 35 U.S.C. 154(b) by 382 days.

(21) Appl. No.: 15/127,319

(22) PCT Filed: Mar. 11, 2015

(86) PCT No.: PCT/DE2015/100099
§ 371 (c)(1),
(2) Date: Sep. 19, 2016

(87) PCT Pub. No.: WO2015/139683
PCT Pub. Date: Sep. 24, 2015

(65) Prior Publication Data
US 2017/0153026 A1 Jun. 1, 2017

(30) Foreign Application Priority Data
Mar. 20, 2014 (DE) .................. 10 2014 103 812

(51) Int. Cl.
*F23D 3/40* (2006.01)
*F23D 5/12* (2006.01)
*B60H 1/22* (2006.01)

(52) U.S. Cl.
CPC .............. *F23D 3/40* (2013.01); *B60H 1/2203* (2013.01); *F23D 5/123* (2013.01)

(58) Field of Classification Search
CPC .......... F23D 3/40; F23D 5/123; B60H 1/2203
(Continued)

(56) References Cited

U.S. PATENT DOCUMENTS 1,341,478 A 5/1920 Platt et al.
1,604,003 A 10/1926 Ward
(Continued)

FOREIGN PATENT DOCUMENTS

CN 200989585 Y 12/2007
CN 101280922 A 10/2008
(Continued)

OTHER PUBLICATIONS

Kuwako et al, JPH094821A English machine translation, Jan. 10, 1997 (Year: 1997).*
(Continued)

*Primary Examiner* — Edelmira Bosques
*Assistant Examiner* — Phillip Decker
(74) *Attorney, Agent, or Firm* — Quarles & Brady LLP

(57) ABSTRACT

The invention relates to an evaporator burner (100) for a mobile heating device operated with liquid fuel, comprising: a mixture-preparing region (2) for mixing fuel with combustion air to form an air-fuel mixture, a fuel supply (1) for supplying liquid fuel to the mixture-preparing region (2), a combustion-air supply (B) for supplying combustion air to the mixture-preparing region (2), a reaction region (3) arranged downstream of the mixture-preparing region (2) for reacting the air-fuel mixture, heat thus being released, and an evaporator body (9) for evaporating the liquid fuel, which evaporator body extends in an axial direction in the mixture-preparing region (2) at a distance from a side wall and has an outer peripheral surface designed as a fuel-evaporating surface, which outer peripheral surface is arranged in such a way that the supplied combustion air flows around the outer peripheral surface.

15 Claims, 7 Drawing Sheets

(58) Field of Classification Search
USPC .................................................. 237/12.3 C
See application file for complete search history.

(56) References Cited

U.S. PATENT DOCUMENTS

| | | | |
|---|---|---|---|
| 2,373,757 | A | 4/1945 | Hart |
| 2,560,074 | A | 7/1951 | Bloomer |
| 3,007,310 | A | 11/1961 | Eisele |
| 3,531,229 | A | 4/1969 | Berglund |
| 3,502,268 | A | 3/1970 | Miskulin |
| 3,869,242 | A * | 3/1975 | Schladitz ................ B01B 1/005 431/11 |
| 4,004,875 | A | 1/1977 | Zink et al. |
| 4,098,567 | A | 7/1978 | Hubbert |
| 4,106,891 | A * | 8/1978 | Schladitz ................ F23D 11/44 392/396 |
| 4,484,886 | A * | 11/1984 | Nakamura ................ F24C 5/04 126/96 |
| 4,569,652 | A * | 2/1986 | Nakamura ................ F24C 5/04 126/96 |
| 4,703,888 | A | 11/1987 | Kawamura et al. |
| 5,082,175 | A | 1/1992 | Koch et al. |
| 5,090,896 | A | 2/1992 | Kenner et al. |
| 5,197,871 | A * | 3/1993 | Yamamoto ................ F23D 3/40 126/110 B |
| 5,350,293 | A | 9/1994 | Khinkis et al. |
| 5,359,966 | A | 11/1994 | Jensen |
| 5,616,021 | A | 4/1997 | Onimaru et al. |
| 5,947,717 | A | 9/1999 | Steiner et al. |
| 5,993,197 | A | 11/1999 | Alber et al. |
| 6,027,334 | A * | 2/2000 | Blaschke ................ F01N 3/0256 126/116 R |
| 6,540,151 | B1 * | 4/2003 | Steiner ................ F23Q 7/001 237/12.3 C |
| 6,811,395 | B2 * | 11/2004 | Schlecht ................ F23D 3/40 237/12.3 C |
| 7,762,807 | B2 | 7/2010 | Linck et al. |
| 8,573,968 | B2 | 11/2013 | Kaupert |
| 10,113,742 | B2 * | 10/2018 | Dell ................ F23D 3/40 |
| 10,234,136 | B2 * | 3/2019 | Dell ................ F23D 3/40 |
| 10,302,298 | B2 * | 5/2019 | Ilchenko ................ F23D 3/40 |
| 2002/0015930 | A1 | 2/2002 | Poe et al. |
| 2004/0170936 | A1 | 9/2004 | Weclas et al. |
| 2006/0147854 | A1 | 7/2006 | Fullemann |
| 2007/0231761 | A1 | 10/2007 | Rosen et al. |
| 2008/0020336 | A1 * | 1/2008 | Kaeding ................ F23C 99/006 431/75 |
| 2009/0263757 | A1 | 10/2009 | Kaupert |
| 2010/0092897 | A1 | 4/2010 | Wunning et al. |
| 2011/0173953 | A1 | 7/2011 | Neels et al. |
| 2013/0157206 | A1 | 6/2013 | Li et al. |
| 2013/0337388 | A1 * | 12/2013 | Schwanecke ............ F23N 1/02 431/12 |
| 2014/0186782 | A1 | 7/2014 | Eberspach et al. |
| 2014/0346242 | A1 | 11/2014 | Jozinovic et al. |
| 2017/0153026 | A1 | 6/2017 | Dell et al. |
| 2018/0172268 | A1 * | 6/2018 | Ilchenko ................ F23D 3/40 |
| 2018/0172269 | A1 * | 6/2018 | Dell ................ F23D 3/40 |
| 2018/0180283 | A1 * | 6/2018 | Dell ................ F23D 3/40 |

FOREIGN PATENT DOCUMENTS

| | | | |
|---|---|---|---|
| CN | 201129723 | Y | 10/2008 |
| CN | 201636854 | U | 11/2010 |
| CN | 201786438 | U | 4/2011 |
| CN | 102200279 | A | 9/2011 |
| CN | 202813362 | U | 3/2013 |
| DE | 19 18 445 | A1 | 10/1970 |
| DE | 28 12 960 | A1 | 10/1978 |
| DE | 34 03 972 | A1 | 8/1985 |
| DE | 3923238 | A1 | 1/1991 |
| DE | 43 04 057 | A1 | 8/1994 |
| DE | 195 29 994 | A1 | 5/1996 |
| DE | 195 48 223 | A1 | 6/1997 |
| DE | 197 03 555 | A1 | 8/1998 |
| DE | 198 21 672 | A1 | 11/1999 |
| DE | 101 20 027 | A1 | 4/2002 |
| DE | 101 51 617 | A1 | 5/2003 |
| DE | 102 00 524 | C1 | 6/2003 |
| DE | 102 19 633 | C1 | 12/2003 |
| DE | 102004022302 | A1 | 12/2005 |
| DE | 44 47 987 | B4 | 3/2006 |
| DE | 10 2004 049902 | A1 | 4/2006 |
| DE | 10 2006 031867 | A1 | 1/2008 |
| DE | 10 2001 087971 | A1 | 6/2012 |
| EP | 0978686 | A1 * | 2/2000 ............ F21V 37/002 |
| EP | 1 519 110 | A1 | 3/2005 |
| EP | 1 860 379 | A2 | 11/2007 |
| JP | S5364831 | A | 6/1978 |
| JP | S57174607 | A | 10/1982 |
| JP | S61188217 | A | 8/1986 |
| JP | H0524430 | A | 2/1993 |
| JP | H0749104 | A | 2/1995 |
| JP | 9-4821 | A * | 1/1997 |
| JP | H10246408 | A | 9/1998 |
| JP | 2000018520 | A | 1/2000 |
| JP | 2004156898 | A | 6/2004 |
| JP | 2004163090 | A | 6/2004 |
| KR | 101278280 | B1 | 6/2013 |
| RU | 2213298 | C1 | 9/2003 |
| RU | 48619 | U1 | 10/2005 |
| WO | 2012149928 | A1 | 11/2012 |
| WO | 2012155897 | A1 | 11/2012 |
| WO | 2013104349 | A1 | 7/2013 |
| WO | 2013127393 | A1 | 9/2013 |
| WO | 2015 014338 | A1 | 2/2015 |

OTHER PUBLICATIONS

The International Search Report and Written Opinion dated Jun. 16, 2015 for International Application No. PCT/DE2015/100099.
European Patent Office, Machine-Generated English Language Translation of DE 19529994, dated Jun. 11, 2018, 13 pages.
European Patent Office, Machine-Generated English Language Translation of EP 1860379, dated Jun. 11, 2018, 10 pages.
European Patent Office, Machine-Generated English Language Translation of DE 10200524, dated Jun. 13, 2018, 7 pages.
European Patent Office, Machine-Generated English Language Translation of DE 4447987, dated Jun. 12, 2018, 23 pages.
European Patent Office, Machine-Generated English Language Translation of DE 4304057, dated Jun. 13, 2018, 6 pages.

* cited by examiner

EVAPORATOR BURNER FOR A MOBILE HEATING DEVICE OPERATED WITH LIQUID FUEL

CROSS-REFERENCE TO RELATED APPLICATIONS

This application represents the national stage entry of PCT International Application No. PCT/DE2015/100099 filed Mar. 11, 2015, which claims priority of German Patent Application 10 2014 103 812.6 filed Mar. 20, 2014, the contents of which are hereby incorporated herein by reference for all purposes.

The present invention relates to an evaporator burner for a mobile heating device operated with liquid fuel, and to a mobile heating device having an evaporator burner of said type.

In mobile heating devices operated with liquid fuel, use is commonly made of evaporator burners in which the liquid fuel is evaporated, the evaporated fuel is mixed with supplied combustion air to form a fuel-air mixture, and is subsequently reacted with a release of heat.

In the present context, a "mobile heating device" is to be understood to mean a heating device which is designed and correspondingly adapted for use in mobile applications. This means in particular that said heating device is transportable (Possibly fixedly installed in a vehicle or merely accommodated therein for transportation) and is not designed exclusively for permanent static use, such as in the case, for example, of the heating system of a building. Here, the mobile heating device may also be fixedly installed in a vehicle (land vehicle, ship, etc.), in particular in a land vehicle. Said mobile heating device may in particular be designed for the heating of a vehicle interior compartment, for example of a land vehicle, a watercraft or an aircraft, and for the heating of a Partially open space such as can be found for example on ships, in particular yachts. The mobile heating device may also be temporarily used in static fashion, for example in large tents, containers (for example building containers), etc. In particular, the mobile heating device may be designed as an engine-independent heater or auxiliary heater for a land vehicle, for example for a caravan, a motorhome, a bus, a passenger motor vehicle, etc.

With regard to environmental aspects and the legislation in this regard in many countries, it is becoming ever more important to minimize the exhaust-gas emissions of mobile heating devices. In particular in the case of evaporator burners for mobile heating devices, there is the difficulty here that it is sought to realize operation under a variety of external boundary conditions and with different heating power levels, in each case in the most efficient manner possible and with low exhaust-gas emissions.

It is an object of the present invention to provide an improved evaporator burner for a mobile heating device operated with liquid fuel, and to provide an improved mobile heating device having an evaporator burner of said type, which permit operation with very low emissions in particular under a variety of external boundary conditions.

The object is achieved by way of an evaporator burner for a mobile heating device operated with liquid fuel according to claim 1. Advantageous refinements are specified in the dependent claims.

The evaporator burner for a mobile heating device operated with liquid fuel has the following: a mixture preparation region for the mixing of fuel with combustion air to form a fuel-air mixture, a fuel supply for the supply of liquid fuel to the mixture preparation region, a combustion-air supply for the supply of combustion air to the mixture preparation region, a reaction region which is arranged downstream of the mixture preparation region in terms of flow and which serves for the reaction of the fuel-air mixture with a release of heat, and an evaporator body for the evaporation of the liquid fuel, which evaporator body extends in an axial direction in the mixture preparation region so as to be spaced apart from a side wall and has an outer circumferential surface which is in the form of a fuel evaporation surface and which is arranged such that the supplied combustion air flows around said outer circumferential surface.

Here, a mixture preparation region is to be understood to mean a region of the evaporator burner in which, during the normal heating operation of the evaporator burner, mixing of evaporated fuel with combustion air takes place but no reaction of the fuel-air mixture with a release of heat takes place, in particular no flame is formed. Advantageous preparation of the fuel-air mixture can take place in the mixture preparation region before the reaction of said fuel-air mixture in the reaction region. Here, a reaction region is to be understood to mean that region of the evaporator burner in which, during the operation of the evaporator burner, a reaction of the fuel-air mixture with a release of heat takes place, which may be realized in particular in a combustion process involving a flame. A reaction in a flame-free catalytic process, for example, is however also possible. Since the evaporator body is designed so as to extend in the axial direction in the mixture preparation region so as to be spaced apart from the side wall and has the outer circumferential surface in the form of a fuel evaporation surface, around which outer circumferential surface the supplied combustion air flows, particularly reliable evaporation of the liquid fuel and mixing of the evaporated fuel with supplied combustion air to form a fuel-air mixture is realized. In particular, the advantageous mixing to form a homogeneous fuel-air mixture is, owing to the special design of the evaporator body, realized for a relatively wide range of different heating power levels, that is to say different fuel and combustion air supply rates. Owing to the formation of the homogeneous fuel-air mixture already in the mixture preparation region in which no flame forms during the normal operation of the evaporator burner, combustion with particularly low pollutant emissions is realized in the reaction region arranged downstream in terms of flow.

In one refinement, the evaporator body extends in the axial direction proceeding from a rear wall of the mixture preparation region. In this case, the liquid fuel can advantageously be transferred from the fuel supply to the evaporator body directly at the rear wall of the mixture preparation region.

In one refinement, the evaporator body is of tower-like form. In particular, it is possible here for the evaporator body to project in tower-like form from the rear wall into the mixture preparation region. Here, it is preferably possible for the evaporator body to extend at least over a major part of the axial length of the mixture preparation region. The tower-like form of the evaporator body permits a good flow of combustion air around the evaporator body over the entire axial length thereof.

In one refinement, the evaporator body has a substantially cylindrical or hollow cylindrical form. A particularly inexpensive embodiment is made possible in this case. By contrast to an exactly mathematically cylindrical or hollow cylindrical form, the evaporator body may for example also narrow or widen over its extent in the direction of the reaction region.

In one refinement, the evaporator body has a length L in the axial direction and a width B perpendicular to the axial direction, for which the following applies: L/B>1.5, preferably L/B>2. In the case of a cylindrical form of the evaporator body, the width corresponds here to the diameter. In the case of a different shape of the evaporator body, said width corresponds to the maximum extent in the radial direction perpendicular to the axial direction. In other words, the evaporator body is in this case significantly longer in the axial direction than it is wide in the direction perpendicular to the axial direction. In this way, a reliable flow of combustion air around the evaporator body over a large axial extent is made possible, whereby a particularly homogeneous fuel-air mixture is provided, in the present context, a reference to an axial direction is to be understood as relating to a longitudinal axis of the evaporator burner.

In one refinement, an electric heating and/or glow element is arranged in the evaporator body. In the case of an embodiment as a heating element, active electric heating of the evaporator body for the purposes of assisting the evaporation process, for example in a starting phase of the combustion operation, is made possible. In the case of an embodiment as a glow element, it is possible for an ignition of the fuel-air mixture to be realized by means thereof for the purposes of starting the combustion process. In the case of a combined heating and glow element, both functionalities can be provided. In particular in the case of an embodiment as a glow element or combined heating and glow element, it is advantageous if said element extends into the reaction region in order to effect an ignition of the fuel-air mixture therein. The electric heating and/or glow element may for example be arranged directly in the material of the evaporator body or else may for example be arranged in an axial body on whose outer circumferential surface the evaporator body is arranged.

In one refinement, an axial body extends along a longitudinal axis in the mixture preparation region and the evaporator body is arranged on an outer circumferential surface of the axial body. In this case, particularly stable positioning of the evaporator body is made possible, and heat energy for assisting the evaporation process can be supplied to the evaporator body via the axial body.

In one refinement, the evaporator body is material-to-material bonded to the outer circumferential surface of the axial body. In this case, particularly good heat transfer from the axial body to the evaporator body is made possible. The cohesive connection may in this case be formed in particular by sintering or welding, preferably by sintering As an alternative to a cohesive connection, a fixed screw connection is for example also possible.

In one refinement, the axial body is in the form of a heat-conducting element for supplying heat from the reaction region to the evaporator body by heat conduction. Here, the axial body may preferably extend into the reaction region or at least as far as close to the reaction region in order to reliably supply heat from the reaction region to the evaporation process. In this case, the axial body is formed from a material with high thermal conductivity and may in particular be formed from a metallic material.

In one refinement, a heat-conducting element is arranged in the evaporator body for the purposes of supplying heat from the reaction region to the evaporator body by heat conduction. Here, the heat-conducting element may be formed by an axial body on whose outer circumferential surface the evaporator body is arranged, or it is possible, for example, for a corresponding additional heat-conducting element to be arranged in the evaporator body itself or in an axial body of said type.

In one refinement, a heatpipe is arranged in the evaporator body for the purposes of supplying heat from the reaction region to the evaporator body. With a heatpipe of said type, particularly good transportation of heat is made possible via an evaporating and re-condensing medium, such that the evaporation process can be assisted in a highly targeted manner with heat from the reaction region.

In one refinement, a cover is provided on an end, facing toward the reaction region, of the evaporator body. In this case, an uncontrolled escape of fuel at the face-side end of the evaporator body can be reliably prevented, and the flow at the inlet into the reaction region can be set in targeted fashion.

In one refinement, a supporting-air supply is provided for the supply of a part of the combustion air in a transition section via which the mixture preparation region transitions into the reaction region. In this case, an additional increase of the flow speed at the inlet into the reaction region and particularly stable mixture preparation are realized.

In one refinement, a transition section via which the mixture preparation region transitions into the reaction region is equipped with a cross-sectional variation for the purposes of improving the outflow profile. In this case, it is possible for particularly stable flow conditions to be maintained even in the case of adverse external conditions.

The object is also achieved by way of a mobile heating device operated with liquid fuel, having, an evaporator burner of said type, according to claim 15.

Here, the mobile heating device may preferably be in the form of a vehicle heating device for an engine-independent heater or auxiliary heater.

Further advantages and refinements will emerge from the following description of exemplary embodiments with reference to the appended drawings.

Figure 15:
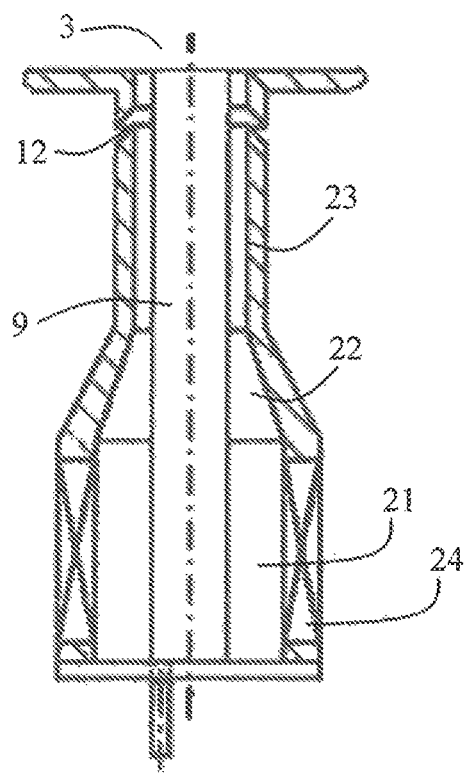
Figure 15:
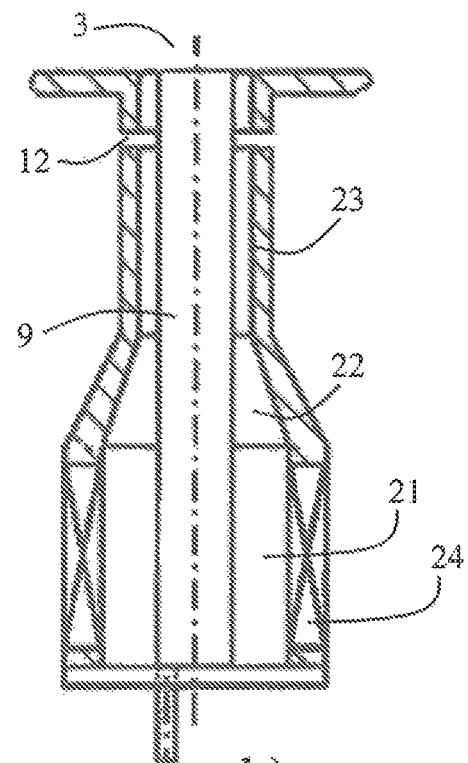
Figure 15:
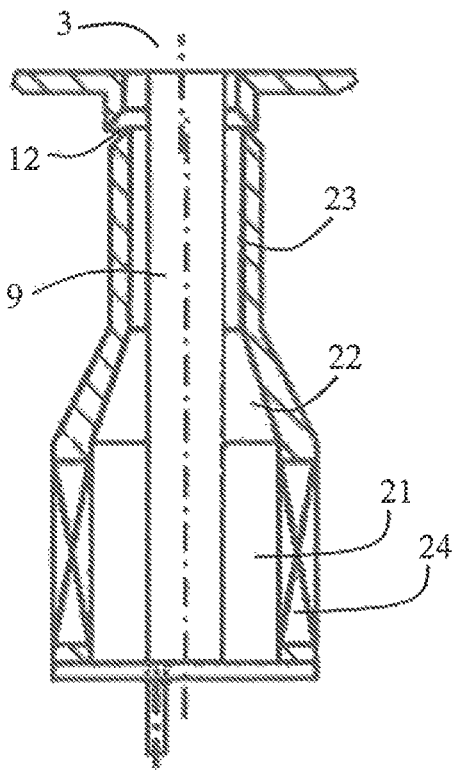
Figure 15:
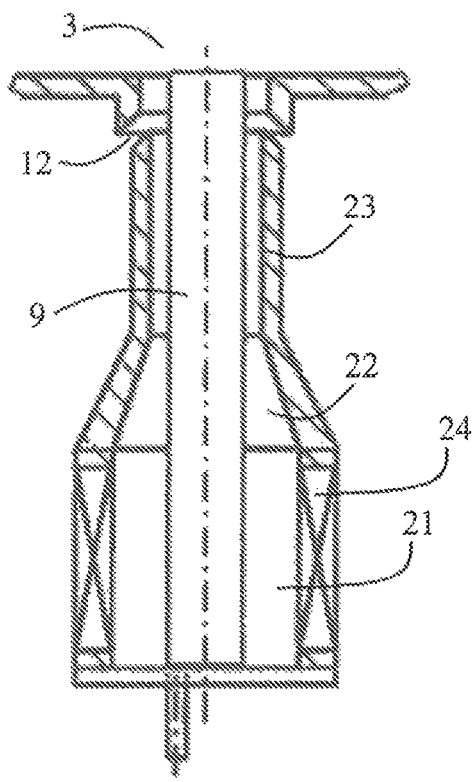

FIGS. 15a) to d) are schematic illustrations of various configurations of a supporting-air supply for improving the operation of the evaporator burner.

Figure 16:
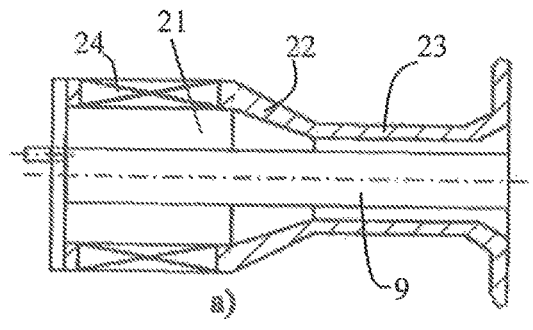
Figure 16:
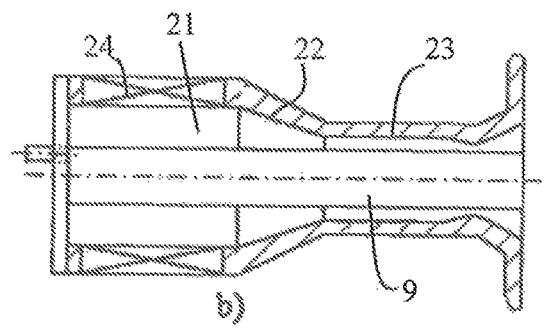
Figure 16:
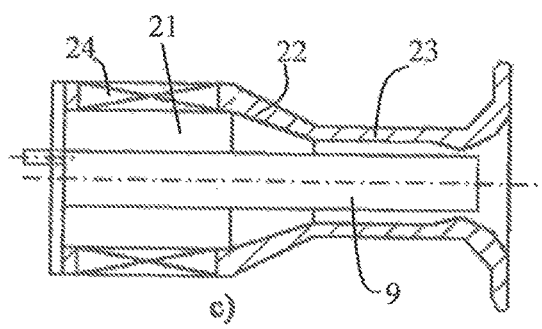
Figure 16:
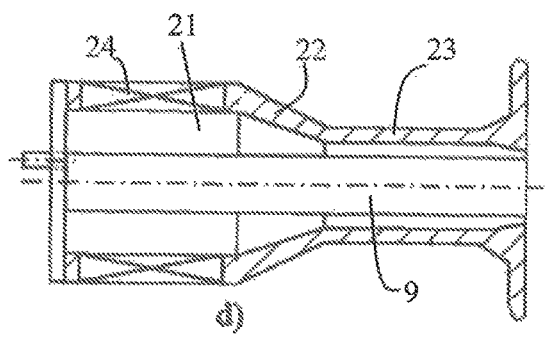
Figure 16:
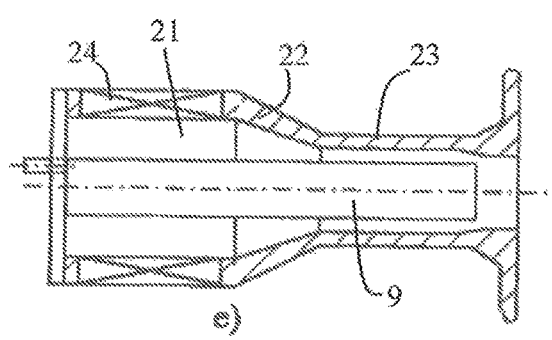

FIGS. 16a) to e) are schematic illustrations of various refinements of a transition section.

Figure 17:
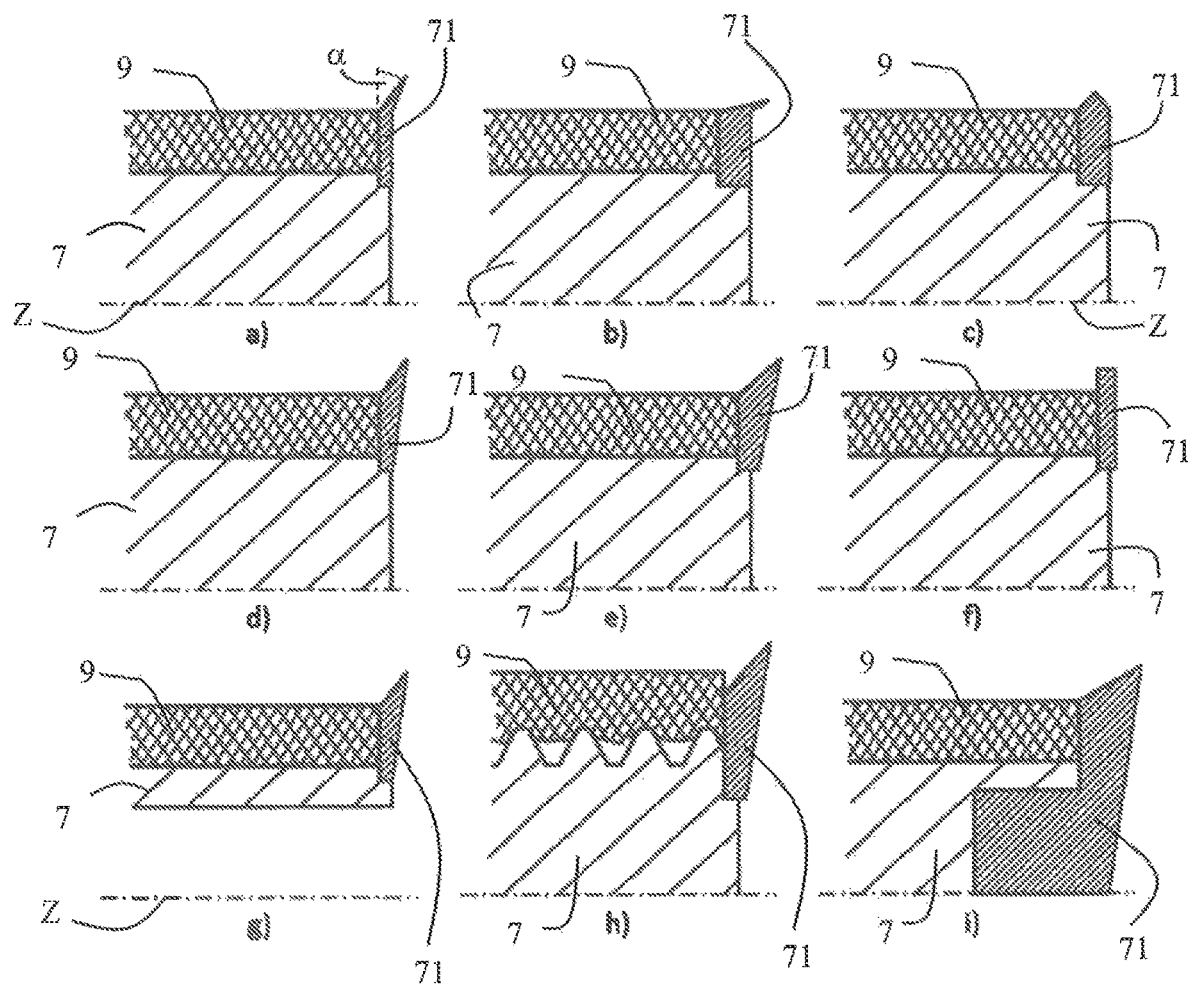

FIGS. 17a) to i) are schematic illustrations of refinements of the second embodiment.

FIRST EMBODIMENT

A first embodiment of the evaporator burner will be described below with reference to FIG. 1 and FIG. 2).

The evaporator burner 100 according to the first embodiment is designed for a mobile heating device operated with liquid fuel. Here, the evaporator burner 100 is designed specifically for a vehicle heating unit, in particular for an engine-independent heater or auxiliary heater of a motor vehicle.

The evaporator burner 100 extends along a longitudinal axis Z. The evaporator burner 100 has a mixture preparation region 2 which has a main chamber 21, a narrowing region 22 adjoining the main chamber 21, and a transition section 23 adjoining the narrowing region 22. In the narrowing region 22, the cross section of the mixture preparation region 2 narrows in a main flow direction H which runs substantially parallel to the longitudinal axis Z. In the schematically illustrated exemplary embodiment, a conical form of the narrowing region 22 is illustrated by way of example, though other configurations are also possible. The transition section 23 forms a transition to the reaction region 3 which adjoins the mixture preparation region 2 and which, in the embodiment, is in the form of a combustion chamber. The reaction region 3 is in this case connected downstream of the mixture preparation region 2 in terms of flow, as will emerge in more detail from the following description. In the embodiment, the transition section 23 has a substantially cylindrical shape with a substantially constant cross section. The transition section 23 may however also have some other shape.

An abrupt cross-sectional widening is formed at the transition from the transition section 23 of the mixture preparation region 2 to the reaction region 3. The flow cross section available for the gases which flow into the evaporator burner 100 thus widens abruptly at the transition from the mixture preparation region 2 to the reaction region 3.

During the operation of the evaporator burner 100, a reaction of a fuel-air mixture in a combustion process involving a flame takes place, with a release of heat, in the reaction region 3. The combustion exhaust gases A generated during said reaction flow through a combustion pipe 4, which adjoins the reaction region 3, into a heat exchanger 5 in which at least a part of the released heat is transferred to a medium M to be heated. Even though an additional combustion pipe 4 of said type is provided in the specific exemplary embodiment, a combustion pipe of said type is not imperatively required. It is possible, for example in the case of an adequately long design of the reaction region 3, for the narrowed region of the combustion pipe 4 as illustrated here to be dispensed with. In the schematically illustrated embodiment, the heat exchanger 5 is of pot-like form, and the hot combustion exhaust gases A are diverted at the end of the combustion pipe 4 on the base of the heat exchanger 5. After the diversion, the combustion exhaust gases A flow in a flow chamber formed between, an outer side of the combustion pipe 4 and an inner shell of the heat exchanger 5 to an exhaust-gas outlet 6.

Figure 1:
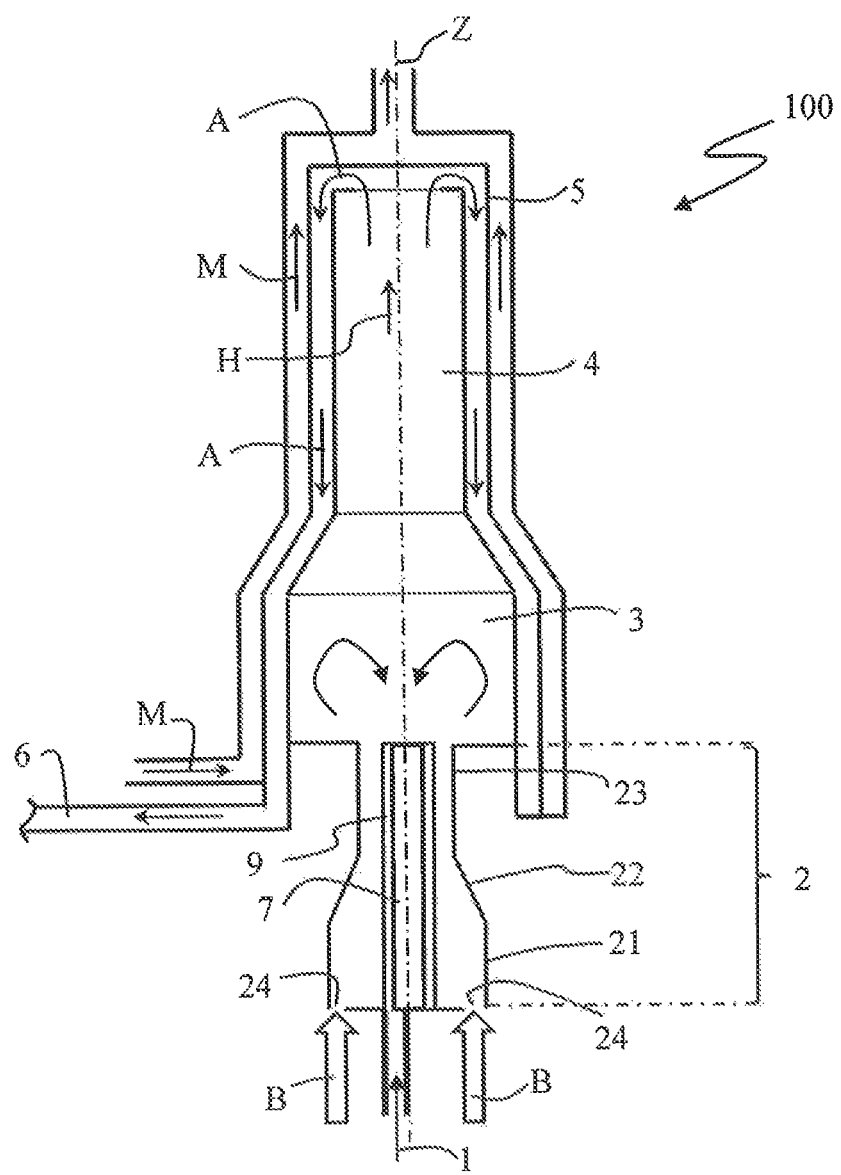
FIG. 1 is a schematic illustration of an evaporator burner as per an embodiment.
Figure 2:
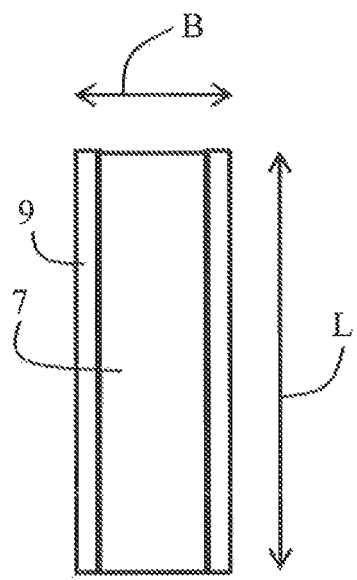
FIG. 2 is a schematic enlarged illustration of an axial body having an evaporator body arranged thereon in the embodiment.

The medium M to be heated flows in a flow chamber which is formed between the inner shell of the heat exchanger 5 and an outer shell of the heat exchanger 5, as is schematically illustrated in FIG. 1 by arrows. Here, in the embodiment, the medium M to be heated flows oppositely to the flow direction of the combustion exhaust gases A in the heat exchanger 5 in order to realize the best possible heat transfer. The medium M to be heated may in this case be formed in particular by for example air to be heated or a liquid to be heated, in particular the cooling liquid in a cooling-liquid circuit of a vehicle. The inner shell of the heat exchanger 5 is manufactured from a material with high thermal conductivity in order to ensure good heat transfer from the hot combustion exhaust gases A to the medium M to be heated.

Below, the design of the mixture preparation region 2 in the first exemplary embodiment will be described in more detail.

The evaporator burner 100 has a fuel supply 1 for the supply of a liquid fuel. The liquid fuel may in this case be formed in Particular by a fuel which is also used for the operation of an internal combustion engine of the vehicle, in particular by gasoline, diesel, ethanol or the like. The fuel supply 1 is, in FIG. 1, illustrated merely schematically by a fuel, supply line and an arrow. The fuel supply 1 may however—in a manner known per se—also have a fuel delivery device which may be formed in particular by, for example, a fuel dosing pump. The fuel supply 1 is designed for delivering and dosing fuel in a well-defined manner.

The fuel supply 1 opens into the mixture preparation region 2. In the schematically illustrated embodiment, the fuel supply 1 opens out in this case at a rear wall of the mixture preparation region 2, which rear wall closes off the mixture preparation region 2 at the rear side. The mixture preparation region 2 is delimited laterally by a side wall which defines the profile of the main chamber 21, of the narrowing region 22 and of the transition section 23.

Also provided is a combustion air supply B which, in FIG. 1, is illustrated merely schematically by an arrow. The combustion air supply B has a combustion-air blower (not illustrated) for the delivery of combustion air to the mixture preparation region 2. The mixture preparation region 2 has a multiplicity of combustion air inlets 24 through which the combustion air can enter the mixture preparation region 2. In the exemplary embodiment, the combustion air is introduced into the mixture preparation region 2 with intense swirl, that is to say with a large tangential flow component. Here, the swirl of the combustion air may be imparted for example by way of correspondingly oriented guide vanes or the like. Even though FIG. 1 schematically illustrates an arrangement in which the combustion air inlets 24 are arranged radially at the outside on the rear wall of the mixture preparation region 2, other arrangements are also possible. For example, the combustion air inlets may also be arranged laterally on the side wall of the mixture preparation region 2.

In the embodiment, there is arranged in the mixture preparation region 2 an axial body 7 which extends along the longitudinal axis Z proceeding from the rear wall of the mixture preparation region 2 and so as to be spaced apart from the side wall of the mixture preparation region 2. In the first embodiment, the axial body 7 is of rod-shaped form and is formed from a non-porous material. The axial body 7 has a substantially cylindrical form and, in the first embodiment, extends through the main chamber 21, the narrowing region 22 and the transition section 23. The axial body 7 is arranged substantially centrally, with respect to its radial orientation, in the mixture preparation region 2. The axial body 7 has an outer circumferential surface on which there is arranged an evaporator body 9 composed of a porous, absorbent material. The evaporator body 9 may in this case have in particular a metal nonwoven, a metal fabric, a metallic or ceramic sintered body or the like. It is preferably possible here for the evaporator body 9 to extend around the axial body 7 over the entire outer circumference thereof.

Even though FIG. 1 and. FIG. 2 schematically illustrate an embodiment in which the evaporator body 9 extends substantially over the entire axial length of the axial body 7, it is for example also possible for the evaporator body 9 to extend only over a subregion of the axial body 7. Owing to the described configuration, the evaporator body 9 thus extends in the manner of a tower into the mixture preparation region 2. The evaporator body 9 extends along the longitudinal axis Z proceeding from the rear wall of the mixture preparation region 2 and so as to be spaced apart from the side wall of the mixture preparation region 2. In the embodiment, the evaporator body 9 has in this case a substantially hollow cylindrical shape and bears firmly against the axial body 7. In a particularly preferred configuration, the evaporator body 9 is cohesively connected to the material of the axial body 7. This may be realized for example by sintering or welding. A cohesive connection by sintering is preferred because, in this case, the pores of the capillary porous structure can be substantially maintained. In the case of the cohesive bond, particularly good heat transfer from the axial body 7 to the evaporator body 9 is made possible. By way of the cohesive connection, the dimensional stability of the evaporator body 9 can be reliably ensured over the entire service life, and the evaporation rate can be increased by way of the good heat transfer and introduction of heat into the liquid.

The supplied liquid fuel is, at the rear wall of the mixture preparation region 2, transferred from the fuel supply 1 to the evaporator body 9, in which a distribution of the liquid fuel takes place. Here, the fuel supply 1 opens out directly opposite the evaporator body 9. Owing to the porous, absorbent configuration of the evaporator body 9, the liquid fuel is distributed here both in the circumferential direction of the evaporator body 9 and in the axial direction of the evaporator body 9. Proceeding from the evaporator body 9, the supplied liquid fuel evaporates and is mixed, in the mixture preparation region 2, with the supplied combustion air which flows along the surface of the evaporator body 9. Owing to the fact that the combustion air is supplied with intense swirl, good mixing of the evaporated fuel with combustion air to form a fuel-air mixture occurs already here. Here, the combustion air flows around the evaporator body 9 with a tangential flow component. The length L of the evaporator body 9 in the axial direction greatly exceeds the width B of the evaporator body 9 in the radial direction perpendicular to the axial direction. Here, the width B is to be understood to mean the maximum extent in the radial direction perpendicular to the axial direction, which corresponds to the diameter in the special case of a cylindrical body with a circular cross section. In particular, for the ratio of the length L to the width B, the following applies: L/B>1.5. It is preferably the case that L/B>2.

In the narrowing region 22 of the mixture preparation region 2, owing to the reduction in cross section, the axial, flow speed of the fuel-air mixture increases. At the transition from the mixture preparation region 2 to the reaction region 3, a widening of the swirling flow of the fuel-air mixture occurs owing to the abrupt cross-sectional widening, whereby the axial flow speed decreases and, in the center of the reaction region 3 close to the longitudinal axis Z, an axial backflow region or recirculation region forms in which gases flow counter to the main flow direction. H, such that, during the operation of the evaporator burner 100, the flame is anchored in the reaction region 3. In the embodiment, the mixture preparation region 2 and the reaction region 3 are thus formed separately both in spatial terms and in functional terms.

The dimensions of the narrowing region 22, of the transition region 23 and of the transition to the reaction region 3 are coordinated with the swirling flow of the fuel-air mixture such that backfiring of the flame from the reaction region 3 into the mixture preparation region 2 during normal heating operation is reliably prevented. In particular, the combustion air is supplied to the mixture preparation region 2 with swirl intense enough, that said condition is satisfied. Here, it is ensured that the flow speed in the transition section 23 is high enough that no stable flame can form therein.

The axial body 7 exhibits high thermal conductivity and is in the form of a heat-conducting element such that, during the operation of the evaporator burner 100, heat is conducted back from the combustion process taking place in the reaction region 3 to the mixture preparation region 2 by heat conduction via the axial body 7, in order to realize an advantageous evaporation process of the liquid fuel on the evaporator body 9.

Modifications and Refinements

Below, various modifications of the evaporator body and of the axial body will be described with reference to FIG. 3 to FIG. 13.

Since the other components of the evaporator burner 100 in the modifications do not differ from the first embodiment described above with reference to FIG. 1 and FIG. 2, said components will not be described again, in order to avoid repetitions. Furthermore, all modifications and refinements described above in relation to the embodiment, such as for example in particular the cohesive connection of the evaporator body 9 and of the axial body 7, the stated ratio of length to width in the case of the evaporator body 9 etc., are also possible in the case of the modifications described below. Furthermore, in the description of the modifications, it is also the case that the same reference designations are used for corresponding components.

Figure 3:
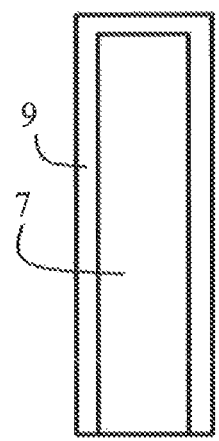
FIG. 3 is a schematic illustration of an axial body having an evaporator body according to a first modification arranged thereon.

The modification illustrated in FIG. 3 of the arrangement composed of evaporator body 9 and axial body 7 differs from the above-described embodiment in that the evaporator body 9 also extends along the free end of the axial body 7 on the side facing toward the reaction region 3. In this case, the face side, which extends transversely with respect to the longitudinal axis Z, of the axial body 7 is also available for an evaporation of the liquid fuel.

Figure 4:
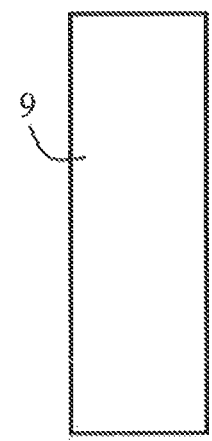
FIG. 4 is a schematic illustration of an evaporator body according to a second modification.

In the modification schematically illustrated in FIG. 4, the evaporator body 9 does not extend along the outer circumference of an axial body; the evaporator body 9 is rather itself in the form of a stable, substantially cylindrical solid body which requires no additional supporting structure.

Figure 5:
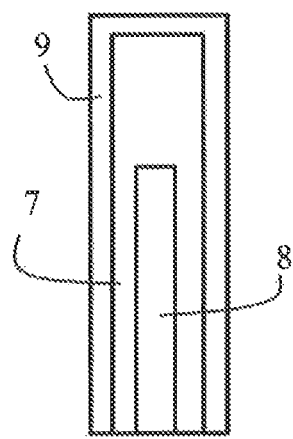
FIG. 5 is a schematic illustration of a third modification with an electric heating element.
Figure 8:
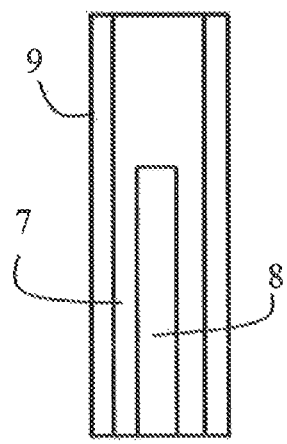
FIG. 8 is a schematic illustration of a sixth modification with an electric heating element.

The construction schematically illustrated in FIG. 5 is based on the construction described in FIG. 3, with an electrical heating element 8 being arranged in the interior of the axial body 7. Likewise, the construction schematically illustrated in FIG. 8 is based on the construction illustrated in FIG. 2, with an electric heating element 8 being arranged in the interior of the axial body 7. In these cases, the electric heating element 8 is in each case in the form of a resistance heating element and, here, may be formed in particular by a so-called heating cartridge. The electric heating element 8 is in this case connected by way of corresponding connections (not illustrated) to an electrical power supply by way of which heating of the electric heating element 8 is made possible. In the case of these modifications, too, the axial body is in each case in the form of a heat-conducting element with high thermal conductivity in order to supply heat from the reaction region 3 to the evaporator body 9 by heat conduction. Through the provision of the electric heating element 8, it is possible for additional heat to be supplied to the evaporator body 9 in targeted fashion in order to assist the evaporation process, for example at a start of heating operation when there is not yet sufficient heat available from the reaction region 3, or in order to realize a high evaporation rate with a high heating power level.

Figure 6:
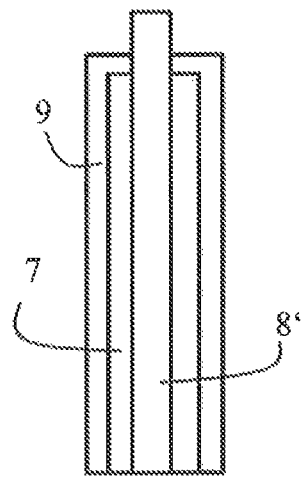
FIG. 6 is a schematic illustration of a fourth modification with an electric glow element.
Figure 7:
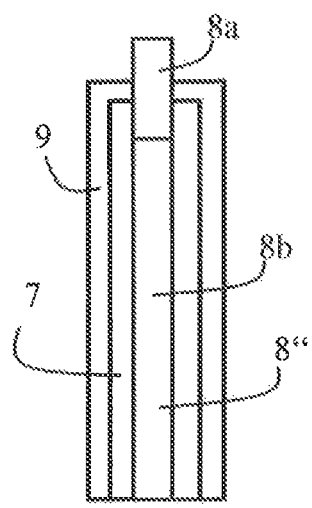
FIG. 7 is a schematic illustration of a fifth modification with an electric heating and glow element.

The modification illustrated in FIG. 6 differs from the configuration illustrated in FIG. 5 in that, instead of the electric heating element 8, an electric glow element 8' is arranged in the axial body 7. Here, the electric glow element 8' is arranged so as to project beyond the axial body 7 at the face side, which faces toward the reaction region 3, of the axial body 7. In this way, it is possible to dispense with a separate ignition element for starting the reaction process of the fuel-air mixture in the reaction region 3, and the reaction process can be initiated by heating the tip of the electric glow element 8'. Here, the electric glow element 8' may in particular also be formed by a combined electric heating and glow element which firstly makes it possible for the evaporation of fuel to be facilitated by way of moderate heating, and which secondly makes it possible for the reaction process to be started by way of intense heating. In a refinement schematically illustrated in FIG. 7, the combined heating and glow element 8" may in this case be of in particular Segmented form, with a subregion 8a facing toward the reaction region 3 being in the form of a glow element for starting the reaction process in the reaction region 3, and a second subregion 8b arranged in the mixture preparation region 2 being designed as a heating element for assisting the evaporation process. Here, the first subregion 8a may in particular be designed such that it can be heated to a higher temperature than the second subregion 8b. Here, it is preferably possible for the first subregion 8a and the second subregion 8b of the combined heating and glow element 8" to be designed to be separately actuable.

Figure 9:
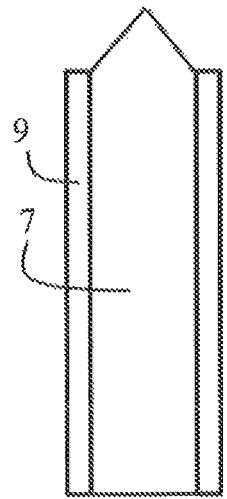
FIG. 9 is a schematic illustration of a seventh modification with an axial body in the form of a heat-conducting element.
Figure 10:
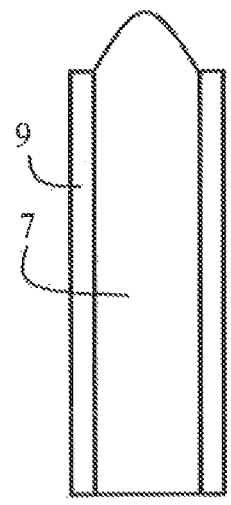
FIG. 10 is a schematic illustration of an eighth modification with an axial body in the form of a heat-conducting element.

In the case of the modifications of the embodiment illustrated in FIG. 9 and FIG. 10, the axial body 7 is also formed in each case as a heat-conducting element for the recirculation of heat from the reaction region 3 by heat conduction. In the modifications illustrated, it is the case here that an exposed face side, facing toward the reaction region 3, of the axial body 7 is in each case of convexly domed form in order to permit a better coupling of heat into the axial body 7. In particular, in this case, it is preferably possible for the axial body 7 to be arranged in the evaporator burner such that the face side of the axial body 7 projects into the reaction region 3.

Figure 11:
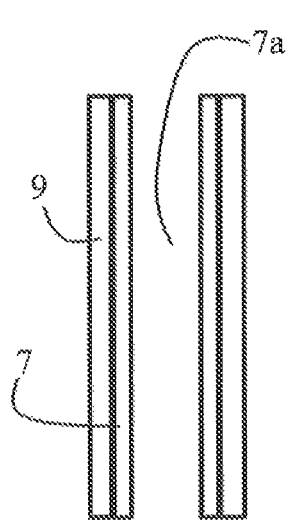
FIG. 11 is a schematic illustration of a ninth modification with a hollow axial body.
Figure 12:
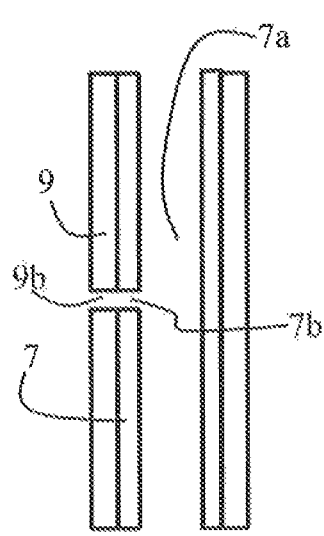
FIG. 12 is a schematic illustration of a tenth modification.

FIG. 11 illustrates a modification in which the axial body 7 is formed not as a massive solid body but as a substantially tubular hollow body with an internal cavity 7a which is open in the direction of the reaction region 3. In the schematically illustrated modification, the axial body 7 is in this case of substantially hollow cylindrical form and serves as a support body for the evaporator body 9 arranged on the outer circumferential surface of the axial body 7. FIG. 12 illustrates a further modification which builds on the modification of FIG. 11 and in which lateral apertures 7b are provided in the wall of the axial body 7, which apertures correspond to lateral apertures 9b in the evaporator body 9. In this case, a return of combustion exhaust gases from the central recirculation region in the reaction region 3 is made possible to the mixture preparation region 2 through the internal cavity 7a and the apertures 7b and 9b is made possible. The modification schematically illustrated in FIG. 13 differs from the modification illustrated in FIG. 12 substantially merely in that the axial body 7 is not equipped with an internal cavity 7a over its entire length, but rather the internal cavity 7a extends only over a part of the axial length of the axial body 7 proceeding from that face side of said axial body which faces toward the reaction region 3. In the specifically illustrated configuration, the internal cavity 7a extends in this case only as far as the apertures 7b and 9b.

Even though the provision of an electric heating element, of an electric glow element or of a combined heating and glow element has been described only with reference to some of the modifications, corresponding elements may also be provided in the case of the other modifications.

As a further refinement, it is also possible for a heatpipe to be arranged in particular in the axial body 7 for the purposes of enhancing the transportation of heat from the reaction region 3 to the mixture preparation region 2 via the axial body 7. In the case of a heatpipe of said type, the transportation of heat is realized by way of a medium which evaporates and re-condenses in the heatpipe.

Second Embodiment

Figure 14:
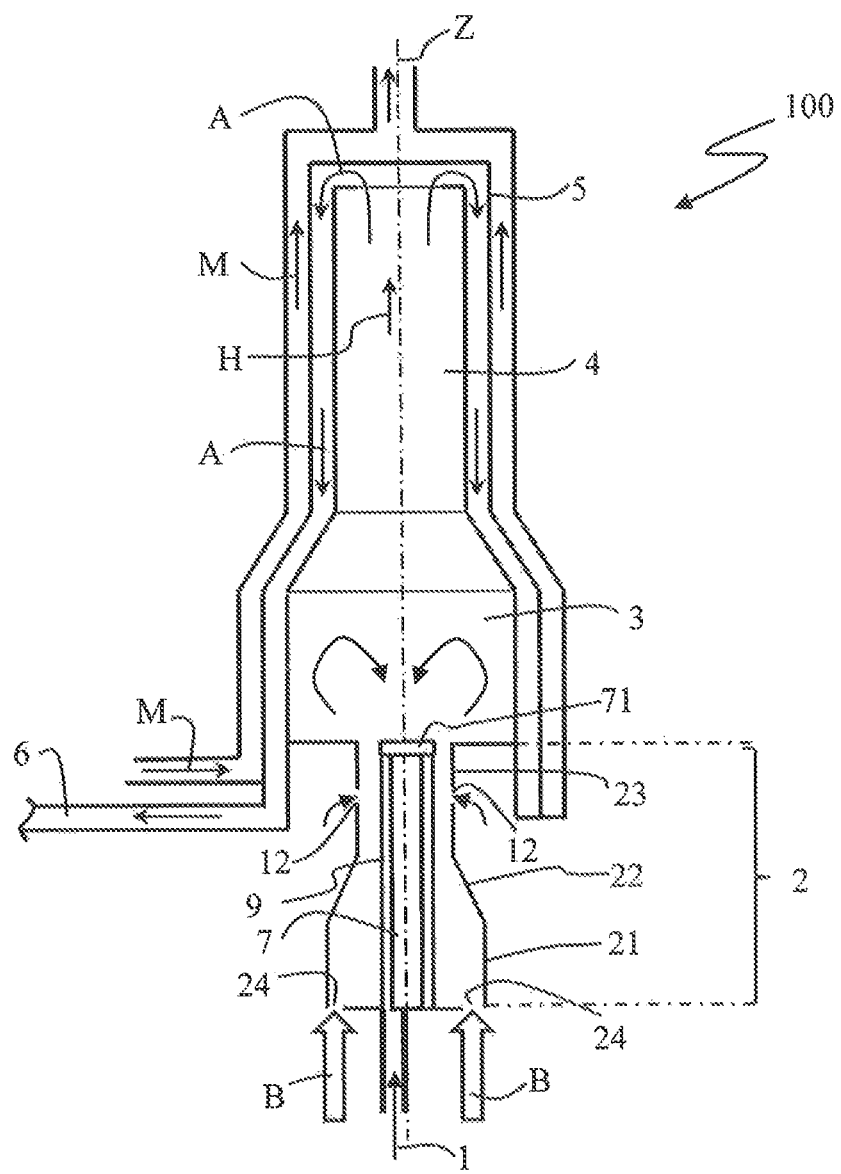
FIG. 14 is a schematic illustration of an evaporator burner as per a second embodiment.

FIG. 14 schematically illustrates a second embodiment of the evaporator burner 100. The evaporator burner according to the second embodiment differs from the above-described first embodiment merely in that the axial body 7 is, at its free end facing toward the reaction region 3, equipped with an additional cover 71, and in that an additional supporting-air supply 12 is provided in the region of the transition section 23. Since the further components do not differ from the above-described first embodiment, the same reference designations are used for the second embodiment as for the first embodiment, and, in order to avoid repetitions, not the entire construction of the evaporator burner 100 will be described again.

Even though both the additional cover 71 and the additional supporting-air supply 12 are realized in the second embodiment described below, it is for example also possible, in a further modification, for only the cover 71 or only the supporting-air supply 12 to be additionally provided.

The cover 71 is arranged on the free end of the axial body 7 such that liquid fuel and also excess fuel vapor cannot emerge in the axial direction at the face side of the axial body 7 but is forced to emerge from the evaporator body 9 in the radial direction. As schematically illustrated in FIG. 14, there is provided on the free face side of the axial body 7 a cover 71 which projects in the radial direction from the outer circumference of the rest of the axial body 7 and which covers the free face side of the evaporator body 9. The cover 71 is formed from at least one substantially impermeable material such that liquid fuel and fuel vapor cannot pass through the cover 71. The cover 71 may preferably be formed from metal, in particular from temperature-resistant high-grade steel. The cover 71 may for example be in the form of a separate covering disk which is fastened non-detachably or detachably to the face-side end of the axial body 7. In another configuration, it is for example also possible for the cover 71 to be produced in one piece with the axial body 7 from the same material.

The cover 71 serves to prevent fuel or fuel vapor from emerging in particular to an increased extent at the free end of the axial body 7 from the evaporator body 9. In this way, it is achieved that the fuel is supplied at least substantially entirely for forming the fuel-air mixture in the mixture preparation region 2. Thus, the Mixture preparation in the mixture preparation region 2 is further improved. Furthermore, adverse influencing of the flame anchoring in the reaction region 3 is prevented.

Figure 13:
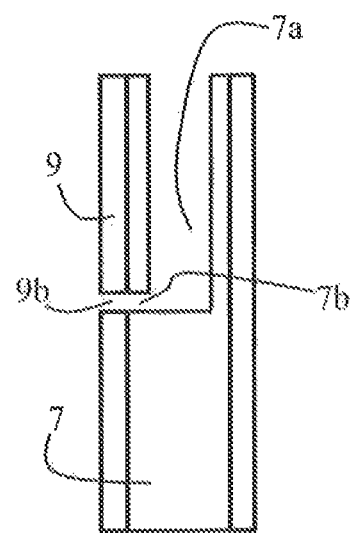
FIG. 13 is a schematic illustration of an eleventh modification.

FIGS. 17a) to i) schematically illustrate various further modifications of the cover 71. Said further modifications of the cover 71 may in each case be provided both in the case of a substantially massive axial body 7 and in the case of an axial body 7 with an internal cavity, such as is illustrated in FIGS. 11 to 13.

In the further modifications of the cover 71 illustrated in FIGS. 17a) to i), the cover 71 projects in the radial direction in each case beyond the outer circumference of the evaporator body 9 and provides an at least substantially sharp separation edge for the flow passing along the outer circumference of the axial body 7 and of the evaporator body 9. As is schematically illustrated in FIG. 17a), that region of the cover 71 which projects in the radial direction extends at an angle α relative to a plane which runs perpendicular to the longitudinal axis Z. Here, depending on the desired flow guidance, the angle a may have a value between 0° and 90°.

In the modification schematically illustrated in FIG. 17a), that region of the cover 71 which projects in the radial direction extends for example at an angle c in the range between 35° and 45°, such that the gases flowing along the outer circumference of the evaporator body 9 are diverted radially outward there in a relatively intense manner. Furthermore, in the case of this modification, the projecting region is in the form of a lip which tapers in the radial direction and which projects both in the radial direction and in the axial direction. The projecting region is in this case angled slightly in the direction of the main flow direction H in relation to the rest of the cover 71.

In the modification schematically illustrated in FIG. 17b), that region of the cover 71 which projects in the radial direction extends at a considerably greater angle α, which amounts to between 160° and 170°, such that the gases flowing along the outer circumference of the evaporator body 9 are subjected to a considerably less pronounced radial deflection.

In the case of the modification schematically illustrated in FIG. 17c), that region of the cover which projects in the radial direction extends for example at an angle of between approximately 40° and 50°. Furthermore, in the case of this modification, the projecting region of the cover 71 is also beveled or chamfered on the side averted from the evaporator body 9 in order to influence the flow separation in a targeted manner.

In the case of the modifications schematically illustrated in FIGS. 17d) and 17e), the cover 71 has in each case an altogether more wedge-shaped cross section such that the projecting region of the cover 71 is—by contrast to the modifications of FIG. 17a) and FIG. 17b)—not of angled form in relation to the rest of the cover 71. As is evident from a comparison of the modifications as per FIGS. 17a) and b) and the modifications as per FIGS. 17d), 17e) and 17i), the wedge angle of the radially projecting region of the cover 71 can be set in targeted fashion in this way.

In the modification schematically illustrated in FIG. 17f), the cover 71 is in the form of a substantially ring-shaped disk on the end of the axial body 7, such that the projecting region of the cover projects laterally at an angle α of approximately 0°.

In the case of the modification schematically illustrated in FIG. 17g), the axial body 7 is provided with an internal cavity which is formed so as to be open in the direction of the reaction region 3. In this case, it is for example possible for gases from the reaction region 3 to flow into the interior of the axial body 7. Said additional features may for example also be provided in the other modifications.

FIG. 17h) illustrates, by way of example, a surface structuring of the outer circumference of the axial body 7. Such a surface structuring may preferably likewise also be provided in the other illustrations as per FIGS. 17a) to g) and i). In the case of the modification of FIG. 17h), the cover 71 furthermore bears, in a region situated radially at the inside, directly at a face side against the evaporator body 9, and runs at an angle α of approximately 0°. By contrast, a region of the cover 71 situated further to the outside runs at a relatively large angle α, such that, in turn, a radially projecting, tapering lip is formed. Furthermore, in a region of the evaporator body 9 situated radially at the outside, the cover 71 in this case does not bear directly against the evaporator body 9. These supplementary features of the modification of FIG. 17h) may furthermore also be realized in the other modifications.

In the modification schematically illustrated in FIG. 17i), the cover 71 is in the form of an insert which is inserted with a central protruding peg into a face-side recess of the axial body 7. These further features may in each case also be realized in the other modifications.

The configuration of the cover 71 with the separation edge described here has the further advantage that the flow at the inlet into the reaction region 3 is stabilized even more effectively. Inter alia, it is possible in this way for the generation of pulsations to be prevented. Furthermore, backfiring of the flame into the mixture preparation region 2 can be even more reliably prevented. Altogether, it is in particular furthermore also possible, by way of the modifications of the cover 71 with the described separation edge for the flow of the fuel-air mixture, for the formation of the recirculation region in the reaction region 3 to be additionally yet further stabilized.

By contrast to the first embodiment described above, it is the case in the second embodiment that the supplied combustion air is split up, such that a part of the supplied combustion air is not supplied into the main chamber 21 of the mixture preparation region 2 via the combustion air inlets 24 but is supplied for the first time further downstream in relation to the main flow direction H. Here, the splitting-up of the supplied combustion air may be realized in a simple manner in terms of construction by way of the configuration of the flow paths for the combustion air. As is schematically illustrated in FIG. 14, it is the case in the second embodiment that a supporting-air supply 12 is provided, by way of which a part of the combustion air is supplied to the mixture preparation region 2 for the first time in the transition region 23. Here, the configuration is selected such that the predominant part of the combustion air is supplied into the main chamber 21 via the combustion air inlets 24, and only a small part of the combustion air, which may in particular preferably amount to less than 10 percent of the combustion air quantity, is supplied by way of the supporting-air supply 12. The supporting-air supply 12 is arranged in the region in which the mixture preparation region 2 transitions into the reaction region 3. The supporting-air supply 12 permits an additional stabilization of the flow conditions in the evaporator burner 100.

The supporting-air supply 12 effects an additional acceleration of the fuel-air mixture flowing into the reaction region 3, and ensures that the preparation of the mixture remains stable even in the event of undesired fluctuations and secondary effects. In the specifically illustrated configuration, the supporting-air supply 12 furthermore has the effect that the main flow of the fuel-air mixture in the transition section 23 runs along the axial body 7, and thus prevents an excessively early detachment of the flow from the axial body 7. In this way, in the second embodiment, backfiring of a flame from the reaction region 3 into the mixture preparation region 2 is even more reliably prevented.

Since the flow conditions are additionally stabilized in this way, it is also the case that a more uniform temperature distribution is realized in the mixture preparation region 2, which has a positive effect on the loading and service life of the components.

Even though FIG. 14 illustrates, by way of example, a very simple structural configuration of the supporting-air supply 12, various geometrical configurations are possible. In particular, it is possible for the geometrical configuration to be easily changed in order to set the desired flow conditions and the desired fraction of the combustion air supplied through the supporting-air supply 12.

FIGS. 15a) to d) schematically illustrate various possible configurations of the supporting-air supply 12. In the schematic illustration of FIGS. 15a) to d), in each case one evaporator body 9 is illustrated which does not extend on the outer circumference of an axial body 7 but is itself in the form of a stable solid body. As in the embodiments described above and the modifications thereof, however, it is in each case possible for the evaporator body 9 to be arranged on the outer circumference of a heat-conducting body 7. Furthermore, FIGS. 15a) to d) schematically illustrate combustion air inlets 24 on the side wall of the main chamber 210 Alternatively to this, however, an arrangement of the combustion air inlets 24 as in the embodiments is in turn also possible. Furthermore, FIG. 15a) to d) merely illustrate a detail of the evaporator burner 100 in the region of the mixture preparation region 2.

The, various configurations of the supporting-air guide 12 in figures a) to d) differ in terms of the specific configuration of the outlet openings for the supporting air. Whereas FIG. 15a) shows an embodiment in which the supporting air is supplied substantially rotationally symmetrical both in a radial direction and in an axial direction, FIG. 15b) shows an embodiment in which the supporting air is supplied substantially in the radial direction. It should be noted that the supporting air may in each case possibly additionally also have a tangential flow component. The outlet openings for the supporting air may for example be formed as a continuous slot or a multiplicity of apertures in the wall of the transition section 23. As is schematically illustrated in FIG. 15c), it is for example possible for that region of the transition section 23 which adjoins the reaction region 3 to also be arranged so as to be slightly offset in relation to the rest of the transition section 23 in order to realize an eccentric supply of the supporting air. Furthermore, it is for example also possible for that region of the transition section 23 which adjoins the reaction region 3 to have a slightly larger diameter in order to influence the flow guidance in a targeted manner, as is schematically illustrated for example in FIG. 15d). Furthermore, it is for example possible for the supporting-air supply to be designed not to be rotationally symmetrical but to exhibit targeted asymmetry in order to additionally modulate the flow guidance, whereby a further stabilization of the reaction in the reaction region 3 and a suppression, of vibrations are made possible.

It should also be noted that the additional cover 71 described above with reference to the second embodiment may be provided in all of the modifications in which the evaporator body 9 is arranged on the outer circumference of an axial body 7.

Refinements

FIGS. 16a) to e) show various refinements of the transition section 23 of the mixture preparation region 2, which may be provided both in the case of the first embodiment and the modifications thereof and in the case of the second embodiment.

The schematic illustrations of FIGS. 16a) to e) in turn illustrate a stable evaporator body 9 without axial body 7, though it is in each case possible, as in the embodiments described above, for the evaporator body 9 to be arranged on the outer circumference of an axial body 7. Furthermore, in this case, it is also possible for an additional cover 71 to be provided as has been described with reference to the second embodiment. As an alternative to the arrangement of the combustion air inlets 24 illustrated in FIGS. 16a) to e), it is also in turn possible for the combustion air inlets to be arranged as in the embodiments described above. Furthermore, in FIGS. 16a) to e), it is again the case that merely a detail of the evaporator burner 100 in the region of the mixture preparation region 2 is illustrated, and the illustration is rotated through 90 degrees in relation to the preceding illustrations.

The refinements of the transition section 23 schematically illustrated in FIGS. 16a) to e) once again permit an improvement and stabilization of the flow conditions. In particular, by way of said variation of the contour at the transition to the reaction region 3, it is possible to even more reliably prevent the flame from backfiring from the reaction region 3 into the mixture preparation region 2.

In a first configuration schematically illustrated in FIG. 16a), that region of the transition section 23 which directly adjoins the reaction region 3, that is to say that region of the transition section 23 which is situated furthest downstream, may be designed to widen slightly, in particular for example so as to widen conically, in order to realize an improved outflow profile. In a configuration schematically illustrated in FIG. 16b), the inner cross section of the transition section 23 initially tapers before likewise widening again in the region directly adjoining the reaction region 3. In this case, the flow speed is once again increased as a result of the tapering, such that backfiring of the flame is even more reliably prevented. In the configuration illustrated in FIG. 16c), that region of the transition section 23 which directly adjoins the reaction region 3 widens in two stages, in particular for example in each case conically with, in the flow direction, initially a relatively small cone angle and subsequently a relatively large cone angle.

In the further refinement illustrated in FIG. 16d), the inner cross section of the transition section 23 narrows in the region directly adjoining the reaction region 3 in order to increase the flow speed, wherein, for example, a conical taper may be realized. In the case of the configuration schematically illustrated in FIG. 16e), the transition section 23 furthermore also has, following a tapering region directly adjoining the reaction region 3, an outlet with a constant cross section.

In the refinements illustrated in. FIG. 16c) and FIG. 16e), the evaporator body 9 (or the axial body 7 with the evaporator body 9 arranged thereon) is in each case of somewhat shortened form such that it does not extend over the entire length of the mixture preparation region 2, but rather ends already shortly before the end of the mixture preparation region 2 in relation to the main flow direction H. The evaporator body 9 (or the axial body 7 with the evaporator body 9) is thus, in these refinements, formed so as to be set back somewhat into the outlet of the mixture preparation region 2.

The different geometrical configurations described may also be combined with one another in order to set the desired flow conditions in accordance with the dimensioning of the other regions.

Even though it has been described, with regard to the embodiments, that the axial body 7 extends through the entire mixture preparation region 2 as far as at least into the transition section 23, which is preferable because, in this way, backfiring of the flame into the mixture preparation region 2 can be prevented in a particularly reliable manner, it is for example also possible for the axial body 7 to be of shorter form such that it does not extend, or extends only partially, into the transition section 23 to the reaction region 3. Furthermore, it is on the other hand also possible for the axial body 7 to be designed such that it extends into the reaction region 3. In this case, improved heat conduction from the reaction region 3 via the axial body 7 to the evaporator body 9 is made possible.

The invention claimed is:

1. An evaporator burner for a mobile heating device operated with liquid fuel, said burner comprising:
    a mixture preparation region mixing fuel with combustion air to form a fuel-air mixture, in which mixture preparation region during a heating operation of the evaporator burner no reaction of the fuel-air mixture with a release of heat takes place;
    a fuel supply supplying liquid fuel to the mixture preparation region;
    a combustion-air supply supplying combustion air to the mixture preparation region;
    a reaction region downstream of the mixture preparation region in terms of flow and which serves for the reaction of the fuel-air mixture with a release of heat; and
    an evaporator body composed of a porous, absorbent material for the evaporation of the liquid fuel, said evaporator body extending in an axial direction in the mixture preparation region so as to be spaced apart from a side wall of said mixture preparation region and has an outer circumferential surface forming a fuel evaporation surface and arranged such that the supplied combustion air flows around said outer circumferential surface, wherein an axial body extends from a rear wall of the mixture preparation region along a longitudinal axis in the mixture preparation region, and the evaporator body is arranged on an outer circumferential surface of the axial body.

2. The evaporator burner as claimed in claim 1, wherein the evaporator body extends in the axial direction proceeding from the rear wall of the mixture preparation region.

3. The evaporator burner as claimed in claim 1, wherein the evaporator body forms a tower.

4. The evaporator burner as claimed in claim 1, wherein the evaporator body has a substantially cylindrical or hollow cylindrical form.

5. The evaporator burner as claimed in claim 1, wherein the evaporator body has a length L in the axial direction and a width B perpendicular to the axial direction, for which the following applies: $L/B>1.5$.

6. The evaporator burner as claimed in claim 1, wherein an electric heating and/or glow element is arranged in the evaporator body.

7. The evaporator burner as claimed in claim 1, wherein the evaporator body is material-to-material bonded to the outer circumferential surface of the axial body.

8. The evaporator burner as claimed in claim 1, wherein the axial body is a heat-conducting element for supplying heat from the reaction region to the evaporator body by heat conduction.

9. The evaporator burner as claimed in claim 1, wherein a heat-conducting element is arranged in the evaporator body and supplying heat from the reaction region to the evaporator body by heat conduction.

10. The evaporator burner as claimed in claim 1, wherein a heatpipe is arranged in the evaporator body and supplying heat from the reaction region to the evaporator body.

11. The evaporator burner as claimed in claim 1, wherein a cover is provided on an end, facing toward the reaction region, of the evaporator body.

12. The evaporator burner as claimed in claim 1, wherein a supporting-air supply supplies a part of the combustion air in a transition section via which the mixture preparation region transitions into the reaction region.

13. The evaporator burner as claimed in claim 1, wherein a transition section via which the mixture preparation region transitions into the reaction region, includes a cross-sectional variation for the purposes of improving an outflow profile.

14. A mobile heating device operated with liquid fuel, said device having an evaporator burner, said evaporator burner comprising:
    a mixture preparation region mixing fuel with combustion air to form a fuel-air mixture, in which mixture preparation region during a heating operation of the evaporator burner no reaction of the fuel-air mixture with a release of heat takes place;
    a fuel supply supplying liquid fuel to the mixture preparation region;
    a combustion-air supply supplying combustion air to the mixture preparation region;
    a reaction region downstream of the mixture preparation region in terms of flow and which serves for the reaction of the fuel-air mixture with a release of heat; and
    an evaporator body composed of a porous, absorbent material for the evaporation of the liquid fuel, said evaporator body extending in an axial direction in the mixture preparation region so as to be spaced apart from a side wall of said mixture preparation region and has an outer circumferential surface forming a fuel evaporation surface and arranged such that the supplied combustion air flows around said outer circumferential surface,
    wherein an axial body extends from a rear wall of the mixture preparation region along a longitudinal axis in the mixture preparation region, and the evaporator body is arranged on an outer circumferential surface of the axial body.

15. The mobile heating device operated with liquid fuel as claimed in claim 14, which heating device is a vehicle heating device for an engine-independent heater or auxiliary heater.

* * * * *

UNITED STATES PATENT AND TRADEMARK OFFICE
CERTIFICATE OF CORRECTION

PATENT NO. : 10,544,935 B2
APPLICATION NO. : 15/127319
DATED : January 28, 2020
INVENTOR(S) : Vitali Dell et al.

Page 1 of 1

It is certified that error appears in the above-identified patent and that said Letters Patent is hereby corrected as shown below:

In the Specification

Column 13, Line 29, "210" should be --21.--.

Signed and Sealed this
Thirty-first Day of March, 2020

Andrei Iancu
*Director of the United States Patent and Trademark Office*